United States Patent
Iwama et al.

(10) Patent No.: US 11,287,574 B2
(45) Date of Patent: Mar. 29, 2022

(54) OPTICAL FIBER BUNDLE WITH BEAM OVERLAPPING MECHANISM

(71) Applicant: FURUKAWA ELECTRIC CO., LTD., Tokyo (JP)

(72) Inventors: Masaki Iwama, Tokyo (JP); Shunichi Matsushita, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/018,108

(22) Filed: Sep. 11, 2020

(65) Prior Publication Data

US 2020/0408992 A1   Dec. 31, 2020

Related U.S. Application Data

(63) Continuation of application No. PCT/JP2019/010064, filed on Mar. 12, 2019.

(30) Foreign Application Priority Data

Mar. 12, 2018 (JP) .............................. JP2018-044323

(51) Int. Cl.
  *G02B 6/26* (2006.01)
  *G02B 6/04* (2006.01)
  (Continued)

(52) U.S. Cl.
  CPC ............... *G02B 6/262* (2013.01); *G02B 6/04* (2013.01); *G02B 6/34* (2013.01); *B23K 26/064* (2015.10)

(58) Field of Classification Search
  CPC ...... G02B 6/02042; G02B 6/04; G02B 6/262; G02B 6/34; B23K 26/064; B23K 26/0604;
  (Continued)

(56) References Cited

U.S. PATENT DOCUMENTS 3,508,807 A * 4/1970 Mayer ...................... G02B 6/32
                                                                    385/74
5,953,477 A   9/1999 Wach et al.
(Continued)

FOREIGN PATENT DOCUMENTS

JP      03-130703 A   6/1991
JP      07-168040 A   7/1995
(Continued)

OTHER PUBLICATIONS

International Search Report dated May 21, 2019 in PCT/JP2019/010064 filed on Mar. 12, 2019, citing documents AA-AB & AO-AR therein, 1 page.
(Continued)

*Primary Examiner* — Michael P Mooney
(74) *Attorney, Agent, or Firm* — Oblon, McClelland, Maier & Neustadt, L.L.P.

(57) ABSTRACT

An irradiation spot of the laser beam having a large power density can be formed by a condensing apparatus which combines a plurality of laser lights without using a power combiner. The condensing apparatus comprises an optical fiber bundle formed of a plurality of optical fibers. One end of the optical fiber bundle forms an incident side bundle end, while the other end forms an emission side bundle end. The optical fiber bundle includes, at the emission side bundle end, an optical deflection unit that deflects at least two light beams emitted from respective light emission ends of at least two optical fibers toward different directions, respectively, such that the at least two light beams overlap each other on at least one cross section at rear on an optical path of the emission side bundle end and are then scattered.

13 Claims, 5 Drawing Sheets

(51) Int. Cl.
*G02B 6/34* (2006.01)
*B23K 26/064* (2014.01)

(58) Field of Classification Search
CPC . B23K 26/0608; B23K 26/032; B23K 26/073
See application file for complete search history.

(56) References Cited

U.S. PATENT DOCUMENTS

| 9,415,465 | B2 | 8/2016 | Hirano et al. | |
|---|---|---|---|---|
| 10,942,311 | B2* | 3/2021 | Fujita | H01S 3/2383 |
| 2002/0168140 | A1* | 11/2002 | Asano | G02B 6/2551 |
| | | | | 385/34 |
| 2013/0010353 | A1 | 1/2013 | Berman | |
| 2014/0076870 | A1* | 3/2014 | Hirano | B23K 26/0648 |
| | | | | 219/121.75 |
| 2017/0227721 | A1* | 8/2017 | Yu | H04B 10/25891 |
| 2017/0297144 | A1* | 10/2017 | Nakanishi | B23K 26/0604 |

FOREIGN PATENT DOCUMENTS

| JP | 2002-131588 A | 5/2002 |
|---|---|---|
| JP | 2005-056608 A | 3/2005 |
| JP | 2005-286310 A | 10/2005 |
| JP | 2008-311137 A | 12/2008 |
| JP | 2016-078049 A | 5/2016 |
| WO | 2013/031836 A1 | 3/2013 |
| WO | WO 2013/058072 A1 | 4/2013 |

OTHER PUBLICATIONS

Extended European search report dated Dec. 15, 2021 in corresponding EP Application No. 19766718.1, 8 pages.

* cited by examiner

OPTICAL FIBER BUNDLE WITH BEAM OVERLAPPING MECHANISM

CROSS-REFERENCE TO RELATED APPLICATIONS

This application is a Continuation of International Patent Application No. PCT/JP2019/010064, filed Mar. 12, 2019, which claims the benefit of Japanese Patent Application No. 2018-044323, filed Mar. 12, 2018, both of which are hereby incorporated by reference herein in their entirety.

BACKGROUND OF THE INVENTION

Field of the Invention

The present invention relates to an optical fiber bundle configured such that beams emitted from terminal ends of individual optical fibers overlap each other.

Description of the Related Art

An optical fiber bundle refers to a component in which a plurality of optical fibers are bundled into a single bundle. Patent Literature 1 discloses a high-power pulse laser irradiation apparatus in which a bundle-type optical fiber (optical fiber bundle) is used for transmitting high-power pulse laser to a laser emission head. Since this apparatus uses an optical fiber bundle instead of a single optical fiber for transmitting high-power pulse laser, the output of incident high-power pulse laser is distributed to respective fibers, the load per fiber can be reduced, and a problem of destruction and disconnection of each fiber is reduced.

Patent Literature 2 discloses a light irradiation apparatus that can adjust a beam divergence of the laser light emitted from an optical fiber bundle by changing the orientation of each fiber (that is, the light emitting direction) at the emission end of the bundle optical fiber (optical fiber bundle) in which a plurality of optical fibers are bundled. This apparatus is supposed to be used for a light irradiation apparatus of a photochemical reaction diagnostic treatment system and can change a laser irradiation area in accordance with the size of a cancer cell or increasing a beam divergence to irradiate a wide range when diagnosing cancer, for example.

Patent Literature 3 discloses a semiconductor laser condensing apparatus configured such that emitted lights from a plurality of semiconductor laser devices are condensed via an optical waveguide formed on a substrate and emitted as a high-power laser light from the output end of the optical waveguide. While semiconductor lasers are widely used in information or communication field because a high-quality beam and stable output can be obtained, since the output is generally smaller than the output of a CO2 laser, a YAG laser, or the like, the semiconductor lasers are rarely used in a use of laser processing that requires high power. The semiconductor laser condensing apparatus of Patent Literature 3 can obtain a high-power laser beam used for laser processing by combining emitted lights from a plurality of semiconductor laser devices.

Patent Literature 4 discloses a laser light generation apparatus in which a plurality of optical fibers that separately transmit respective laser lights emitted from a plurality of semiconductor lasers are bundled to form an optical fiber bundle, and the optical fiber bundle is coupled to an incident port of an adapter (laser light condensing unit). The laser light condensing unit used here has an optical transmission path formed of a cavity whose cross-sectional shape gradually tapers and decreases from the incident port to the emission port, and the entire laser lights entering the laser light condensing unit from the plurality of optical fibers are reflected and condensed (narrowed) at the tapered inner wall face of the cavity and emitted from the emission port as a laser beam having a large power density.

CITATION LIST

Patent Literature

Patent Literature 1: Japanese Patent Application Laid-open No. 2002-131588
Patent Literature 2: Japanese Patent Application Laid-open No. H3-130703
Patent Literature 3: Japanese Patent Application Laid-open No. H7-168040
Patent Literature 4: Japanese Patent Application Laid-open No. 2005-286310

SUMMARY OF THE INVENTION

Technical Problem

Laser processing requires emission of a laser beam having a large power density. Thus, when a laser beam formed of a combined light obtained by combining a plurality of laser lights is used, it is preferable to narrow a combined light beam as much as possible for increasing a power density of an irradiation spot thereof. However, since the beam divergence of a beam is larger when the beam emission port is narrowed by using a tapered optical fiber or an optical waveguide (etendue conservation law), narrowing the beam emission port may adversely cause the irradiation spot to expand resulting in a reduced power density.

In addition, since the power density of a light that can be transmitted by an optical fiber is restricted due to light resistance characteristics of the optical fiber, it may be difficult to obtain a combined light having a large power density by using a power combiner to couple the laser light transmitted by a plurality of optical fibers into a single optical fiber. Moreover, when a power combiner is used, a cladding light is likely to be generated because of the increased number of fusion-spliced portions of the optical fiber, and this causes a problem of heat generation caused by absorption of the cladding light in a coating or a resin. In particular, since heat is likely to be generated around a taper portion where a fixing resin is used or a power combiner, a failure such as combustion or disconnection may be caused in such a portion.

In view of the above problems, the present invention intends to provide a condensing apparatus that can form an irradiation spot of a laser beam having a large power density by combining a plurality of laser lights without using a power combiner.

Solution to Problem

The present invention provides an optical fiber bundle formed of a bundle of a plurality of optical fibers, wherein one end of the optical fiber bundle forms an incident side bundle end at which light incident ends of individual optical fibers are arranged, and the other end forms an emission side bundle end at which light emission ends of individual optical fibers are arranged, and wherein the optical fiber bundle includes, at the emission side bundle end, an optical deflection unit that deflects at least two light beams toward different directions, respectively, such that the at least two light beams emitted from respective light emission ends of at least two optical fibers out of the plurality of optical fibers overlap each other on at least one cross section that is at rear on an optical path of the emission side bundle end and are then scattered, thereby solving the above problem.

Advantageous Effects of Invention

According to the present invention, an irradiation spot of the laser beam having a large power density can be formed by overlapping a plurality of laser beams emitted from respective light emission ends of a plurality of optical fibers, and at this time, there is only a small risk of causing a failure such as combustion or disconnection in the optical fiber.

DESCRIPTION OF THE EMBODIMENTS

An optical fiber bundle of the present invention is formed of a bundle of a plurality of optical fibers, one end thereof forms an incident side bundle end at which light incident ends of individual optical fibers are arranged, and the other end forms an emission side bundle end at which light emission ends of individual optical fibers are arranged. When (laser light emission ends of) respective semiconductor laser devices are coupled to light incident ends of respective optical fibers at the incident side bundle end, the respective laser lights transmitted from the corresponding light emission ends of the emission side bundle end are emitted, and these laser lights overlap each other on at least one cross section at the rear on the optical path and are then deflected toward difference directions, respectively, so as to be scattered by the light deflection unit provided at the emission side bundle end. Therefore, when a processing target (workpiece) is placed on the overlapped cross section, a laser irradiation apparatus that forms a high-power density irradiation spot is obtained. Further, when two lenses are arranged at the rear on the optical path of the optical fiber bundle of the present invention, and the light beams emitted from the light emission ends of at least two optical fibers overlap each other on at least two cross sections that are at the rear on the optical path of the emission side bundle end, these components function as a light beam irradiation optical system for securing a distance to some degrees between the emission side bundle end and the workpiece.

When an optical fiber bundle in which a plurality of optical fibers are bundled is used, and each of the optical fiber bundles transmits a laser light generated in the semiconductor laser device separately, since one optical fiber bundle can collectively transmit laser lights generated in the plurality of semiconductor laser devices, and the power of the laser lights generated in the plurality of semiconductor laser devices is distributed to the plurality of optical fibers, respectively, the load on each optical fiber is not excessive. However, since respective laser lights from the plurality of semiconductor laser devices are emitted from light emission ends of other optical fibers as a laser beam, the laser beam having a high power density is not obtained without any countermeasure, because the power is directly distributed to a large area. Therefore, a member referred to as a power combiner is conventionally used for condensing a plurality of laser lights emitted from respective optical fibers to narrow the beam.

Figure 1:
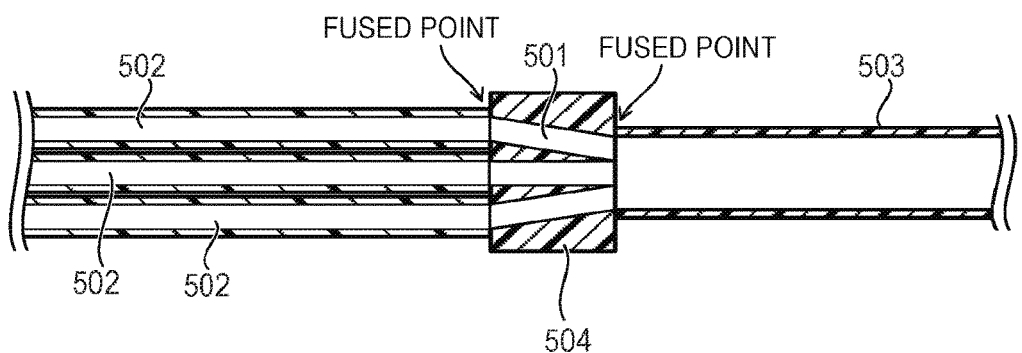
FIG. 1 is a schematic sectional view illustrating general structure of a power combiner as an example.

FIG. 1 is a schematic sectional view illustrating a general structure of a taper fiber bundle that is one type of power combiners as an example and illustrates how to combine a plurality of laser lights emitted from a plurality of optical fibers into a single optical fiber. The taper fiber bundle is formed by bundling a plurality of optical fibers referred to as a taper fiber having the outlet diameter smaller than the inlet diameter. A terminal end (large-diameter side) on the inlet side of each taper fiber 501 is fusion-spliced to each optical fiber 502 forming an optical fiber bundle, respectively, and a terminal end (small-diameter side) on the outlet side of each taper fiber is fusion-spliced to a large-diameter optical fiber 503, collectively. As described above, by using a power combiner, the power of all the laser lights transmitted separately by individual optical fibers forming the optical fiber bundle can be concentrated to one large-diameter optical fiber.

A problem of a taper fiber bundle is that, first, the number of fusion-spliced portions significantly increases because the optical fibers are required to be individually fusion-spliced on the inlet side to each other. When optical fibers having the same diameter are fusion-spliced, the light transmitted through the core is leaked into a clad and a cladding light is likely to be generated if the alignment is incomplete. Since a cladding light is absorbed by a coating or a resin and becomes heat, the cladding light is a factor of causing a failure such as combustion or disconnection due to heat generation. Further, since the taper fiber bundle is manufactured by arranging and fixing a group of taper fibers by a resin, a fixing resin 504 adheres around the taper fiber as illustrated in FIG. 1, and the cladding light is absorbed by these resins and generates heat.

Figure 2:
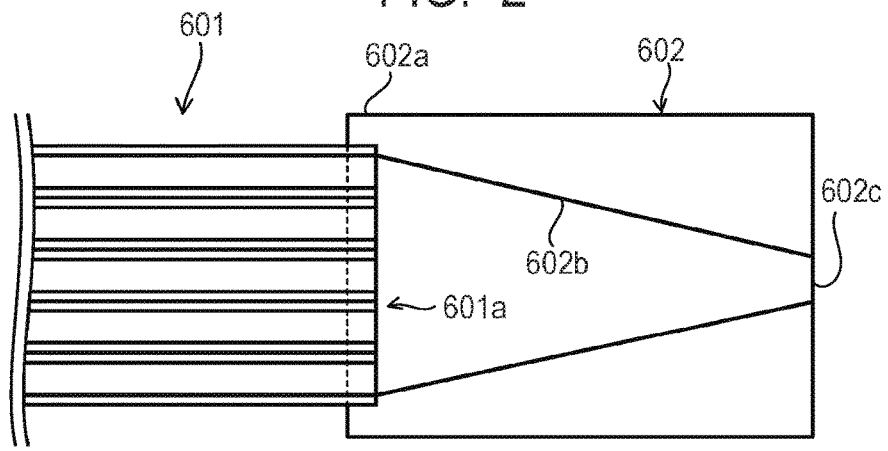
FIG. 2 is a schematic sectional view illustrating a laser condensing unit conventionally designed for condensing a laser light emitted from an optical fiber bundle.

A laser light condensing unit disclosed in Patent Literature 4 solves the above problem of the taper fiber bundle illustrated in FIG. 1. FIG. 2 is a schematic diagram illustrating the laser light condensing unit disclosed in Patent Literature 4. The laser lights emitted from a semiconductor laser unit (not illustrated) having a plurality of light emitting portions are separately transmitted by an optical fiber bundle 601, and an outlet side (laser light emission side) 601a of the optical fiber bundle is connected to an inlet side 602a of a laser light condensing unit (adapter) 602. The laser light condensing unit 602 is a member that uses a tapered cavity as a transmission path, and the entire laser lights emitted from the optical fiber bundle connected to the inlet side are reflected by an inner face 602b of the tapered cavity, condensed toward the outlet side, and emitted from a small-diameter opening 602c provided on the outlet side. When the laser light condensing unit as illustrated in FIG. 2 is used, since the optical fibers are not required to be individually fused to each other, and a fixing resin is not required to be used, a problem of generation of a cladding light due to incomplete alignment or heat generation in accordance with absorption thereof by a resin is avoided.

Figure 3A:
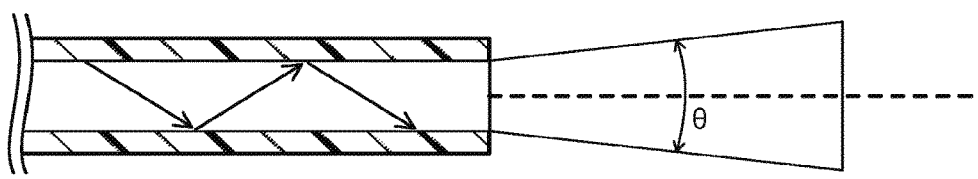
FIG. 3A is a schematic sectional view illustrating that a beam divergence of an emitted light is small when the flux of light is not narrowed.
Figure 3B:
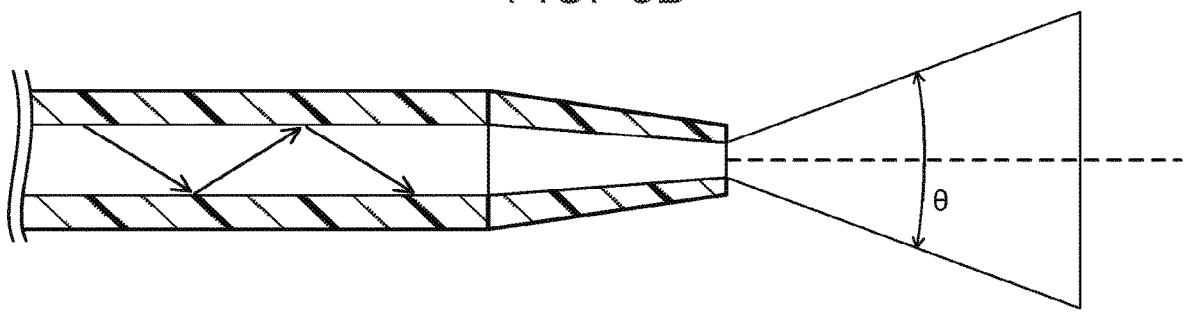
FIG. 3B is a schematic sectional view illustrating that a beam divergence of an emitted light is large when the flux of light is narrowed by a tapered optical fiber.

However, since a cross-sectional area of the flux of light is significantly narrowed by using the laser light condensing unit illustrated in FIG. 2, there is a problem of a large beam divergence of a light emitted from the opening on the outlet side due to the etendue conservation law. FIG. 3A and FIG. 3B are schematic sectional views illustrating that a beam divergence of emitted light is large when the flux of light is narrowed by a tapered optical fiber. FIG. 3A illustrates a case where a cross-sectional area of the flux of light is not narrowed, and FIG. 3B illustrates a case where a cross-sectional area of the flux of light is narrowed to ¼ (diameter is narrowed to half). According to the etendue conservation law, the product of the square of the number of openings (sine of a beam divergence) and a cross-sectional area of the flux of light is constant. That is, an etendue E is defined as the following equation.

$$E = \pi \cdot A \cdot NA^2 \qquad \text{[Math. 1]}$$

In the above equation, a symbol "π" denotes a circular constant, a symbol "A" denotes a cross-sectional area of the flux of light, a symbol "NA" denotes the number of openings, and a symbol "θ" denotes a beam divergence (a solid angle) of the flux of light after emission. In FIG. 3B, since a cross-sectional area A of the flux of light is narrowed to ¼ compared to FIG. 3A, the sine that is sine of a beam divergence is twice the sine of FIG. 3A.

In contrast, in the optical fiber bundle of the present invention, since the flux of light transmitted by individual optical fibers is not narrowed, expansion of the beam divergence of the light beam after emission is small. That is, this is the same as the case of FIG. 3A. On the other hand, a light deflection unit is provided at an emission side bundle end of the optical fiber bundle of the present invention, and light beams emitted in parallel, respectively, from light emission ends of at least two optical fibers out of the plurality of optical fibers overlap each other on at least one cross section at the rear on the optical path at the emission side bundle end and are then deflected toward different directions, respectively, so as to be scattered.

Figure 4A:
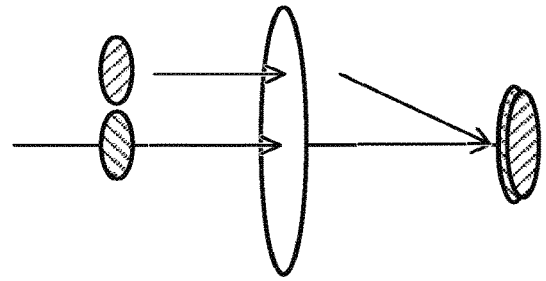
FIG. 4A is a schematic optical path diagram illustrating a configuration forming a light irradiation spot by using a conventional optical fiber bundle.
Figure 4B:
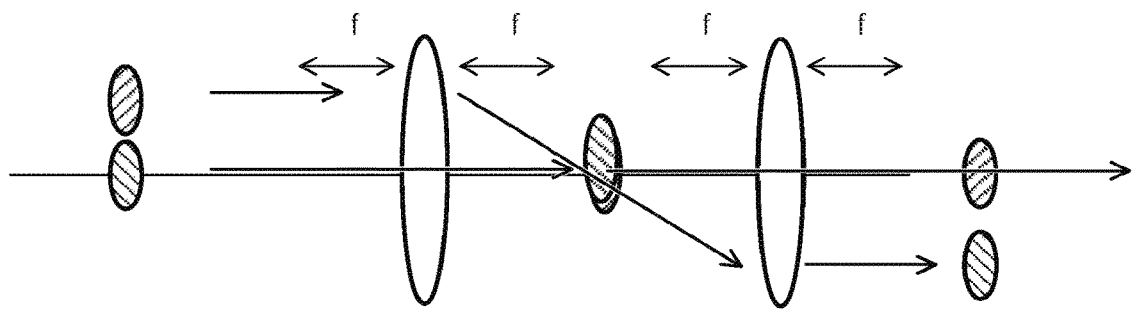
FIG. 4B is a schematic optical path diagram illustrating a configuration forming a light irradiation spot by using a conventional optical fiber bundle.
Figure 4C:
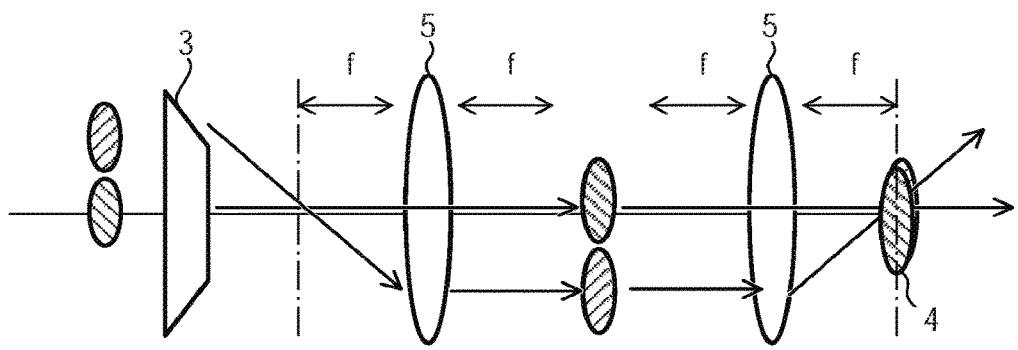
FIG. 4C is a schematic optical path diagram illustrating a configuration forming a light irradiation spot by arranging a lens at the rear of an emission side bundle end of the optical fiber bundle of the present invention compared to the configurations by using the conventional optical fiber bundles (FIG. 4A and FIG. 4B).

FIG. 4A to FIG. 4C are schematic optical path diagrams illustrating a configuration (FIG. 4C) forming a light irradiation spot 4 overlapped by arranging a lens 5 at the rear of the emission side bundle end of the optical fiber bundle of the present invention compared to the configuration by using the conventional optical fiber bundle (FIG. 4A and FIG. 4B). FIG. 4A illustrates a case where one condensing lens is arranged at the rear on the optical path of an emission side bundle end of a conventional optical fiber bundle, and two light beams emitted from two light emission ends in parallel, respectively, are overlapped. Since the case is categorized into one-lens conversion, the size of the overlapped light beam is uniquely determined from the size at the emission and the focal length f of the condensing lens. Thus, when a distance (10 mm or longer) from the emission side bundle end to a position at which the light beams overlap (where a workpiece to be processed is placed) is secured to some degrees, sufficient fluence (power density or energy density) is not obtained. For example, when two parallel light beams having a diameter of 60 μm at the emission, respectively, are condensed by a lens of f=10 mm, each diameter of individual light beams is 24000 μm at the cross section (focus position) on which these light beam spots overlap, and the fluence is significantly reduced.

FIG. 4B illustrates a case where two condensing lenses instead of one lens are arranged, and two parallel light beams are overlapped. In such a case, since an image at the emission is reproduced at a focus position of a lens on the second stage, it is possible to narrow the spot but it is not possible to overlap the spots each other.

In contrast, since a light deflection unit 3 is provided at the emission side bundle end in the optical fiber bundle of the present invention, it is possible to first overlap the spots at a position that is the closest to the rear on the optical path of the emission side bundle end (hereinafter, also referred to as "cross section" assuming a plane intersecting perpendicularly to the optical axis at the position) as illustrated in FIG. 4C. It is therefore possible to overlap spots on the surface of a laser processing target (spot 4) again while suppressing spread of the light beam by reproducing propagation corresponding to the propagation at the emission by an equal-magnification two-lens system. In such a way, when two lenses 5 are arranged at the rear on the optical path of the optical fiber bundle of the present invention, and a plurality of (at least two) light beams overlap each other on at least two cross sections at the rear of the emission side bundle end, a light beam irradiation optical system for securing a distance to a surface of a laser processing target (workpiece) to some degrees can be formed. Further, when a spot on the first cross section at which the irradiance (power density of a spot, that is, beam power/spot size) is the highest is reproduced on the laser processing target (workpiece) by the equal-magnification two-lens system, the power of the laser beams from the plurality of semiconductor laser devices is condensed in a small cross-sectional area on the workpiece, and laser processing of a target can be performed with sufficient fluence.

Figure 5:
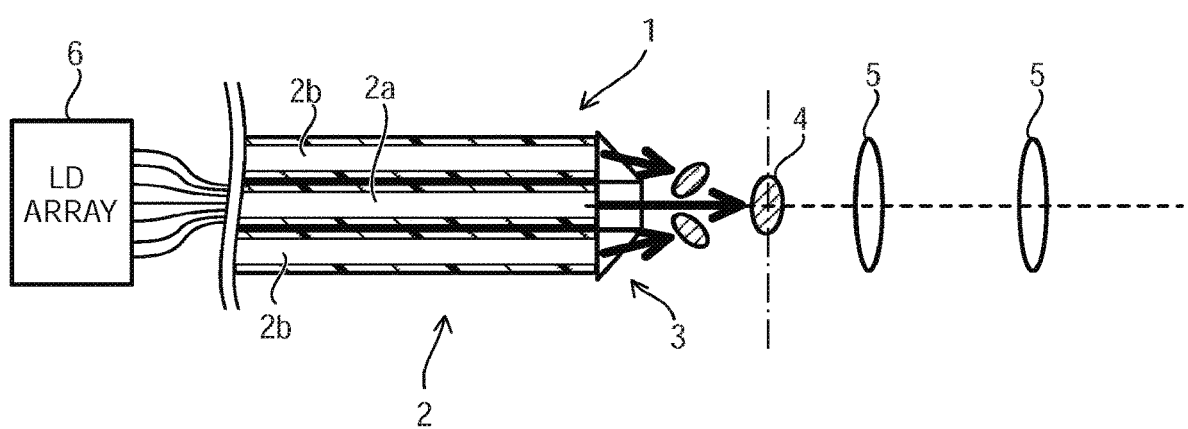
FIG. 5 is a schematic sectional view illustrating an emitting orientation of an emitted light from the optical fiber bundle of the present invention as an example.

FIG. 5 is a schematic sectional view illustrating the emitting orientation of an emitted light from the optical fiber bundle of the present invention as an example. For example, the optical fiber bundle 1 of the present invention has a plurality of light incident ends (not illustrated) at the incident side bundle end for separately introducing the laser lights emitted from a plurality of semiconductor laser devices (LD) 6 to a plurality of optical fibers 2 forming the optical fiber bundle and has a light deflection unit 3 at the emission side bundle end at which light emission ends of the plurality of optical fibers 2 are arranged. In FIG. 5, one optical fiber 2a in which the bundle of the plurality of optical fibers is located at the center and at least one peripheral optical fiber 2b that is adjacent to the periphery thereof are included, and this is formed such that the light beam emitted from the center optical fiber 2a travels straight, and the light beam emitted from the peripheral optical fiber 2b is deflected toward the light beam emitted from the center optical fiber. Further, the light beam emitted from the peripheral optical fiber 2b overlaps the light beam emitted from the center optical fiber 2a at a predetermined position that is at the rear on the optical path of the emission side bundle end to form a spot 4.

Figure 6:
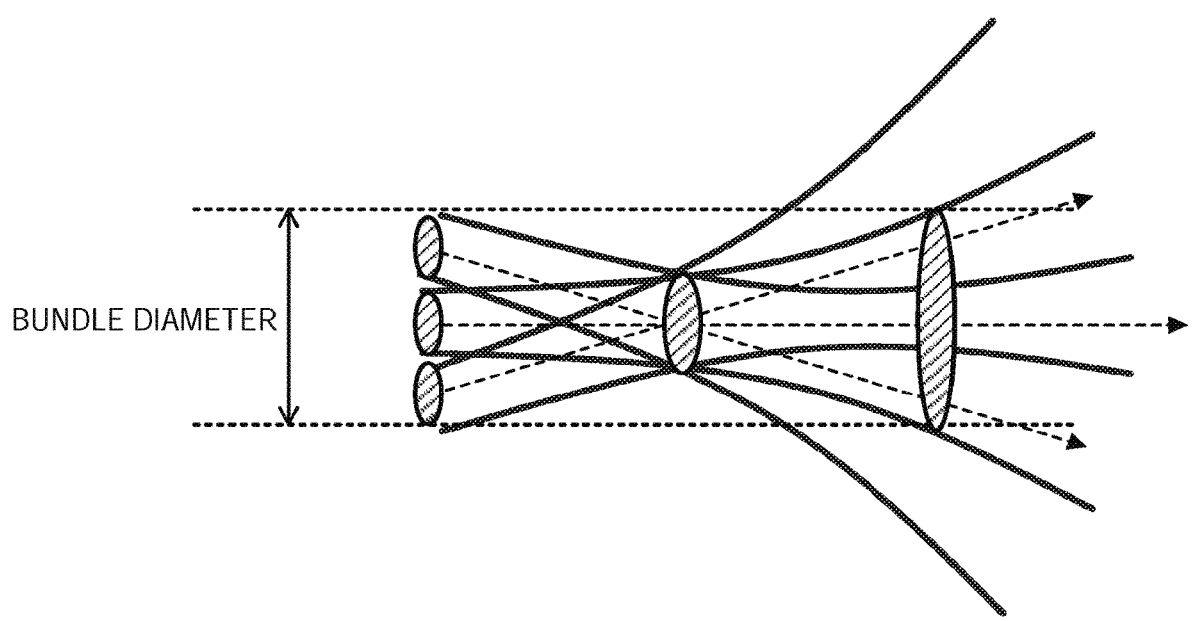
FIG. 6 is a schematic sectional view illustrating how emitted lights from the optical fiber bundle of the present invention are overlapped as an example.

The light beams emitted from individual optical fibers overlap each other while spreading. FIG. 6 is a schematic sectional view illustrating how the emitted lights from the optical fiber bundle of the present invention are overlapped as an example. As illustrated in FIG. 6, when the light beams completely overlap each other before spreading to the diameter of the optical fiber bundle, the power density is improved compared to individual optical beams. That is, the irradiance (power density) in the region in which a plurality of (at least two) light beams overlap each other on a cross section is configured to be larger than the power density of individual light beams at the light emission end. Therefore, as illustrated in FIG. 5 or FIG. 6, when the light beam emitted from the center optical fiber 2a travels straight, and the light beam emitted from peripheral optical fiber 2b is deflected toward the light beam emitted from the center optical fiber 2a, it is preferable that the light beam emitted from peripheral optical fiber 2b be deflected toward the optical axis direction at an angle that is larger than the beam divergence of the beam.

Figure 7:
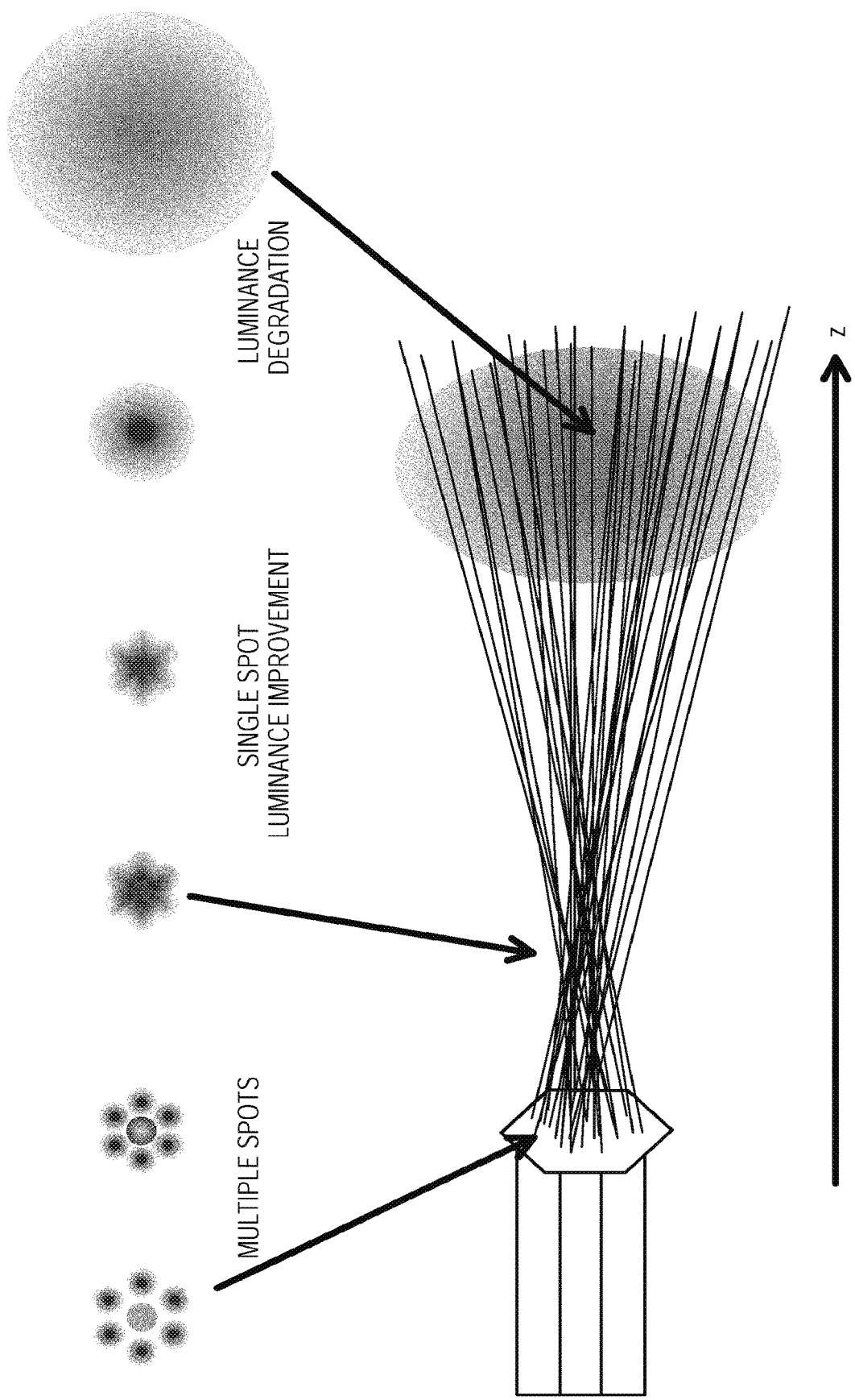
FIG. 7 is a schematic diagram illustrating a relationship between propagation of emitted light from the optical fiber bundle of the present invention and irradiance of a light irradiation spot as an example.

FIG. 7 is a schematic diagram illustrating a relationship between propagation of the emitted light from the optical fiber bundle of the present invention and irradiance (power density) of the light irradiation spot as an example. As illustrated in FIG. 7, the light beams emitted from individual optical fibers is not yet condensed at the emission side bundle end, and therefore, power densities of individual light beams remain unchanged. Since a plurality of light beams after emission are condensed and come closer to each other and, at the same time, each beam propagates while gradually spreading, the power densities of individual light beams gradually decrease. On the other hand, as condensation of light progresses, the advantage of the improved power density due to overlapping of light beams starts appearing, and when this advantage exceeds the advantage of reduction in the power density of individual light beams due to beam spread, the irradiance of the overlapped region will be improved. That is, at a position at which all the light beams overlap each other and form a single spot, the spread of individual beams does not reach the size which just includes a plurality of spots obtained immediately after emission at the emission side bundle end, when the irradiance of the single spot of interest is improved compared to the irradiance (power density) obtained immediately after emission of individual light beams. After the single spot is formed, the advantage of a reduction in the irradiance (power density) of individual light beams and the advantage of a reduction in the irradiance due to scattering of optical beams synergistically work, and therefore the irradiance of the spot is rapidly reduced (degraded).

The light deflection unit included in the optical fiber bundle of the present invention can be any unit as long as it causes at least two light beams emitted from a plurality of optical fibers, respectively, to be deflected toward different directions so that the at least two light beams overlap each other on at least one cross section that is at the rear on an optical path of the emission side bundle end and are then scattered. Typically, while a refractive optical element such as a lens or a prism is used, a reflective optical element such as a mirror or a diffractive optical element such as a grating may be used. The present invention causes the beam to be deflected at an angle exceeding the spread of a flux of light and employs, as an irradiation spot for laser processing, a cross section in which the irradiance of the region in which the beams overlaps reaches the peak, which is the essence of the present invention.

Specifically, a light deflection unit considered to be preferably used in the present invention may be a unit in which the tip end of an optical fiber having a cross-section size including the optical fiber bundle is formed into a spherical shape or a lens shape. In such a case, each light emission face of the plurality of optical fibers forming the optical fiber bundle and the light incident face of the optical fiber forming the light deflection unit are fusion-spliced. However, since the optical fiber forming the light deflection unit has a cross-section size including the optical fiber bundle, even if the alignment is slightly incomplete, the probability of occurrence of a cladding light is small.

Figure 8:
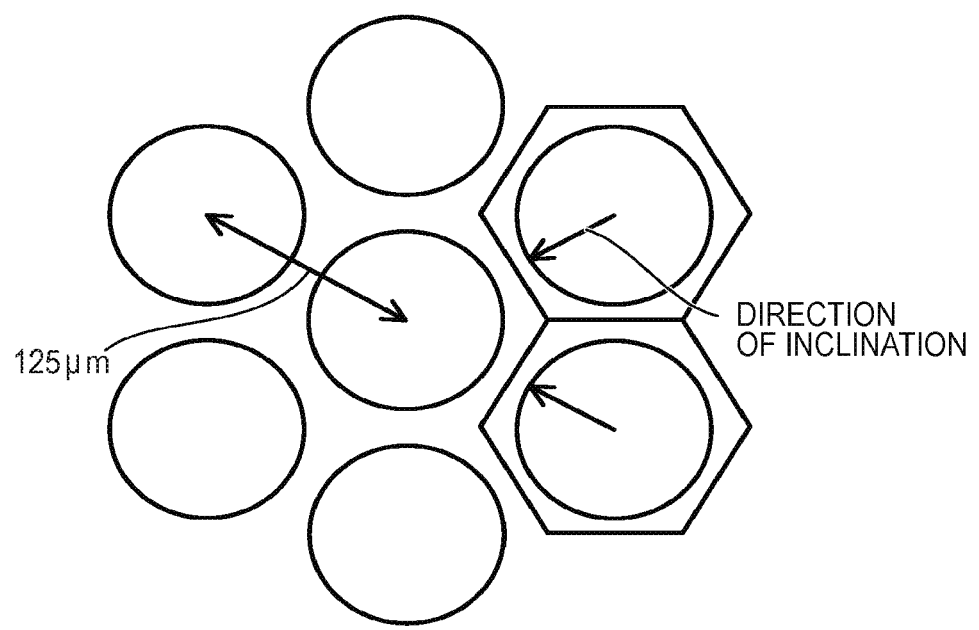
FIG. 8 is a schematic diagram illustrating a case where a prism is used as a light deflection unit of the optical fiber bundle of the present invention as an example.

A light deflection unit preferably used in the present invention may be a micro-prism as well. FIG. 8 illustrates an example of an optical fiber bundle having a micro-prism at the emission side bundle end. FIG. 8 is a diagram illustrating the emission side bundle end viewed from a light emission side. The optical fiber bundle illustrated in FIG. 8 is a bundle in which six optical fibers are bundled to be adjacent around one optical fiber located at the center, and as a whole, is an optical fiber bundle in which seven optical fibers are bundled. This bundle form can be referred to as a closest-packing form and is preferable for reducing a cross-sectional area of the overall optical fiber bundle. Since the core diameter of a typical multi-mode fiber is 105 µm, and the clad diameter is 125 µm, the distance between the centers of adjacent fibers is 125 µm. Seven micro-prisms with different inclinations may be provided at the tip end of such an optical fiber bundle. Since the emitted light from the center optical fiber may travel straight, the surface of the center part of the prism may be perpendicular to the optical axis. The emitted lights from the six peripheral optical fibers are required to be deflected toward the emitted light from the center optical fiber and may thus be inclined backward from the center side to the peripheral side, respectively. Note that the same function as such a prism can also be realized by a diffractive optical element.

Further, the optical deflection unit used in the present invention may be configured such that the light emission ends of the plurality of (at least two) optical fibers, the emitted lights from which are to be deflected, face different directions, respectively. In such a case, the tip end of the corresponding optical fiber is not required to be fusion-spliced to the light deflection unit, and the (tip end of) optical fiber itself forms the light deflection unit.

Note that it is preferable that the plurality of light beams emitted from the optical fiber bundle of the present invention be incoherent to each other. This is because, when coherent light beams are condensed, interference fringes are generated in the irradiation spot, and uniformity of the power density is lost. To address this, the peak wavelengths of the incident laser lights from the plurality of semiconductor laser devices connected to the incident side bundle end of the optical fiber bundle of the present invention are preferably separated from each other by more than or equal to a half width at half maximum of spectral line width of respective laser beams condensed at the emission side bundle end. Moreover, in the plurality of optical fibers forming the optical fiber bundle of the present invention, it is preferable that the difference of the length from light incident end to the light emission end be sufficiently large (for instance ten or more times) with respect to the wavelength of the laser light generated by the plurality of semiconductor laser devices.

What is claimed is:

1. An optical fiber bundle comprising a bundle of a plurality of individual optical fibers, wherein one end of the optical fiber bundle forms an incident side bundle end at which light incident ends of the individual optical fibers are arranged, and the other end forms an emission side bundle end at which light emission ends of the individual optical fibers are arranged, wherein the bundle of the plurality of optical fibers includes a center optical fiber and at least one peripheral optical fiber that is adjacent to the center optical fiber, and wherein the bundle further comprises at the emission side bundle end, an optical deflection unit that deflects light beams emitted from the respective light emission ends of the plurality of optical fibers such that a light beam emitted from the center optical fiber travels straight along an optical axis of the center optical fiber, and a light beam emitted from the at least one peripheral optical fiber has a positive angle of beam divergence and is deflected toward the optical axis of the center optical fiber at an angle that is larger than the beam divergence half angle of the light beam emitted from the at least one peripheral optical fiber, the light beams emitted from the respective light emission ends of the center optical fiber and the at least one peripheral optical fiber overlapping each other on at least one cross section that is at rear on an optical path of the emission side bundle end and then being scattered.

2. The optical fiber bundle according to claim 1, wherein the optical fiber bundle is configured such that irradiance of a region in which the light beams emitted from the respective light emission ends of the center optical fiber and the at least one peripheral optical fiber overlap each other on the at least one cross section is larger than individual power densities of the light beams at the light emission end.

3. The optical fiber bundle according to claim 1, wherein the optical fiber bundle is configured such that the light beams emitted from the respective light emission ends of the center optical fiber and the at least one peripheral optical fiber are incoherent to each other.

4. The optical fiber bundle according to claim 1, wherein the light deflection unit is formed of a unit in which a tip end of an optical fiber having a cross-section size including the optical fiber bundle is formed in a spherical shape, a lens, or a prism shape.

5. The optical fiber bundle according to claim 1, wherein the light deflective unit is formed of a micro-prism.

6. The optical fiber bundle according to claim 1, wherein the light deflective unit is formed of a diffractive optical element.

7. The optical fiber bundle according to claim 1, wherein respective light emitting faces of the center optical fiber and the at least one peripheral optical fiber face different directions to form the light deflective unit.

8. A light beam irradiation optical system comprising: the optical fiber bundle according to claim 1; and two lenses arranged at the rear on the optical path of the optical fiber bundle, wherein the optical system is configured such that the light beams emitted from the respective light emission ends of the center optical fiber and the at least one peripheral optical fiber overlap each other on the at least two cross sections at the rear on an optical path at the emission side bundle end.

9. A laser irradiation apparatus comprising: the optical fiber bundle according to claim 1; and a plurality of semiconductor laser devices arranged on the incident end side of the optical fiber bundle, wherein the apparatus is configured such that laser lights generated by the plurality of semiconductor laser devices separately enter the plurality of optical fibers of the optical fiber bundle.

10. The laser irradiation apparatus according to claim 9, wherein the plurality of semiconductor laser devices generate laser light having peak wavelengths that are separated from each other by more than or equal to half width at half maximum of spectral line width of the light beams emitted from the respective light emission ends of the plurality of optical fibers.

11. The laser irradiation apparatus according to claim 9, wherein the at plurality of optical fibers are different from each other in that lengths from light incident ends of the optical fibers to light emission ends of the at optical fibers differ with a sufficiently large difference with respect to wavelengths of laser lights generated by the plurality of semiconductor laser devices.

12. A light beam irradiation optical system comprising:
an optical fiber bundle comprising a bundle of a plurality of optical fibers, wherein one end of the optical fiber bundle forms an incident side bundle end at which light incident ends of individual optical fibers are arranged, and the other end forms an emission side bundle end at which light emission ends of individual optical fibers are arranged, and the optical fiber bundle further comprising: at the emission side bundle end, an optical deflection unit that deflects at least two light beams toward different directions, respectively, such that the at least
two light beams emitted from respective light emission ends of at least two optical fibers out of the plurality of optical fibers overlap each other on at least one cross section that is at rear on an optical path of the emission side bundle end and are then scattered; and
two lenses arranged at the rear on the optical path of the optical fiber bundle, wherein the optical fiber bundle is configured such that the at least two light beams overlap each other on the at least two cross sections at the rear on an optical path at the emission side bundle end.

13. A laser irradiation apparatus comprising:
a light beam irradiation optical system comprising:
an optical fiber bundle comprising a bundle of a plurality of optical fibers, wherein one end of the optical fiber bundle forms an incident side bundle end at which light incident ends of individual optical fibers are arranged, and the other end forms an emission side bundle end at which light emission ends of individual optical fibers are arranged, and the optical fiber bundle further comprising: at the emission side bundle end, an optical deflection unit that deflects at least two light beams toward different directions, respectively, such that the at least two light beams emitted from respective light emission ends of at least two optical fibers out of the plurality of optical fibers overlap each other on at least one cross section that is at rear on an optical path of the emission side bundle end and are then scattered; and
a plurality of semiconductor laser devices arranged on an incident end side of the optical fiber bundle, wherein the optical fiber bundle is configured such that laser lights generated by the plurality of semiconductor laser devices separately enter the at least two optical fibers of the optical fiber bundle, wherein the plurality of semiconductor laser devices generate laser light having peak wavelengths that are separated from each other by more than or equal to half width at half maximum of spectral line width of the at least two light beams.

\* \* \* \* \*